No. 719,471. PATENTED FEB. 3, 1903.
E. KAISER.
WATER PURIFIER.
APPLICATION FILED MAY 8, 1902.
NO MODEL. 2 SHEETS—SHEET 1.
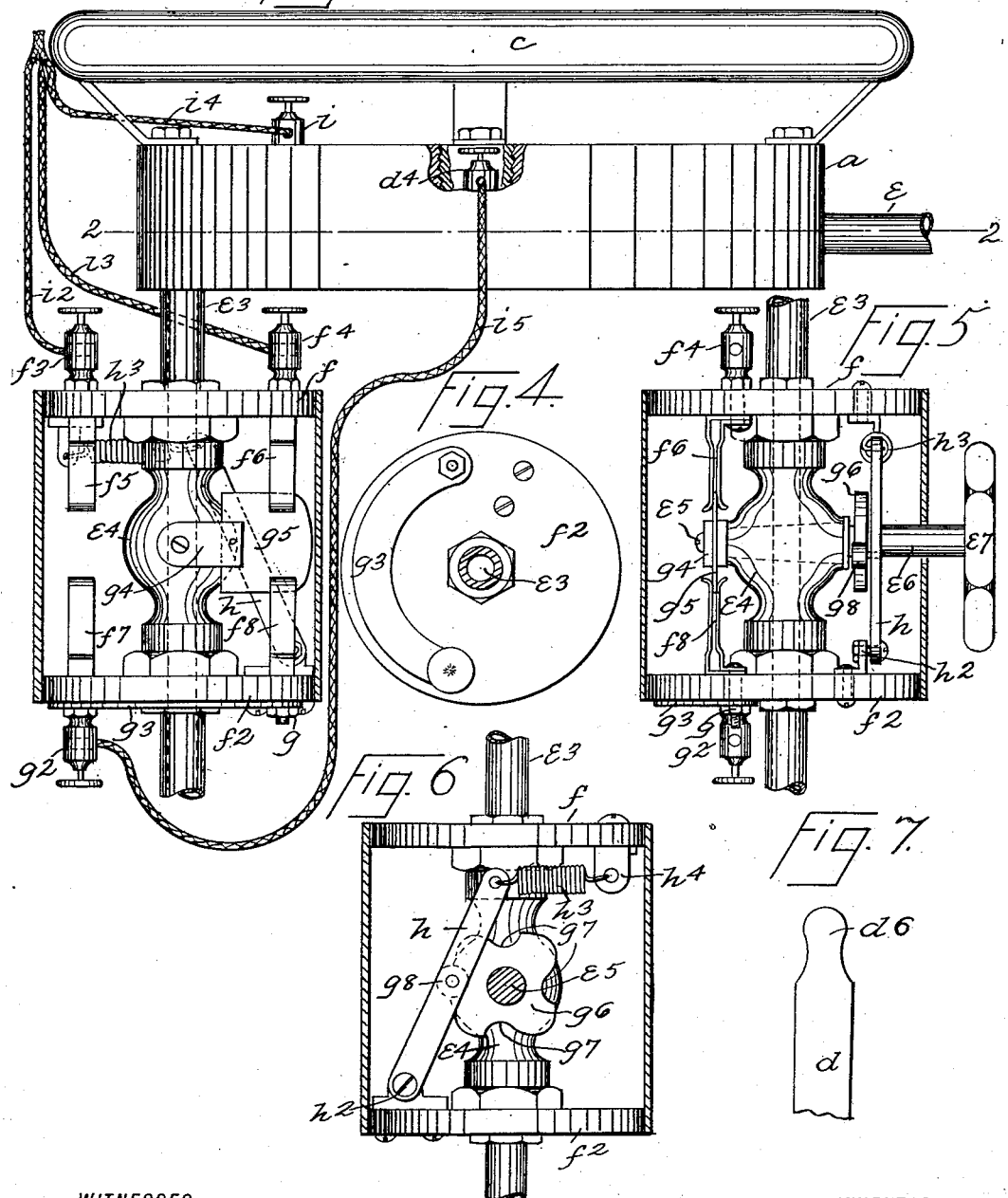
WITNESSES
J. E. Larsen
F. A. Stewart
INVENTOR
Ernest Kaiser
BY
Edgar Tate & Co
ATTORNEYS

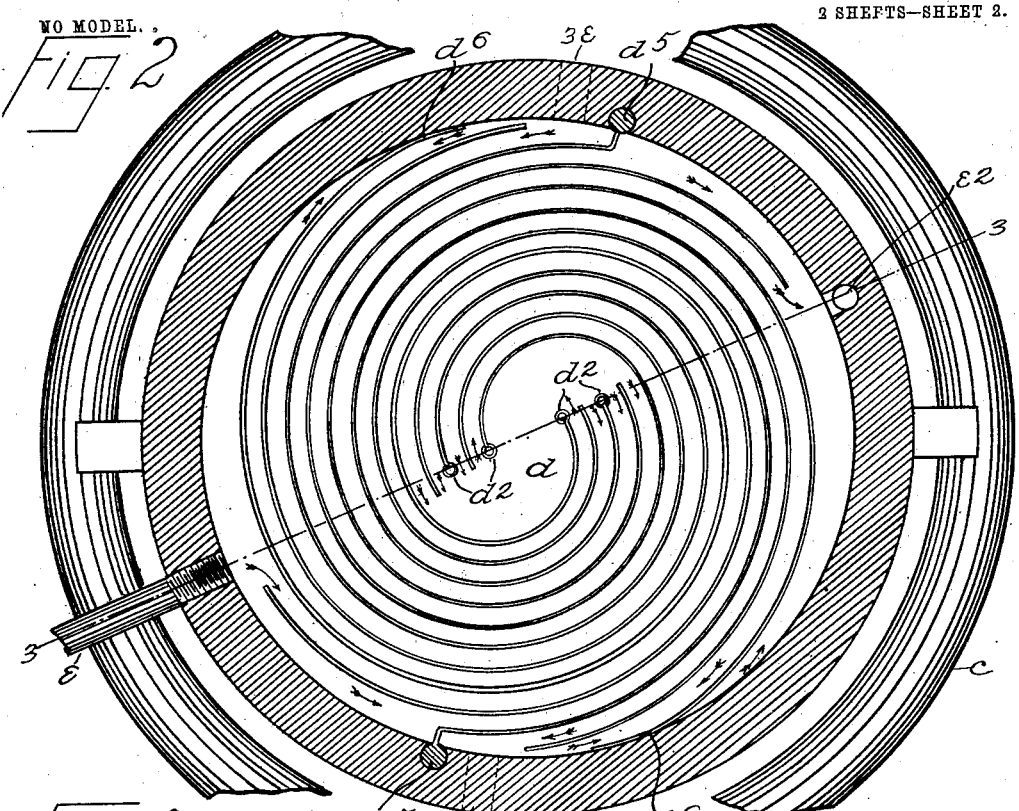
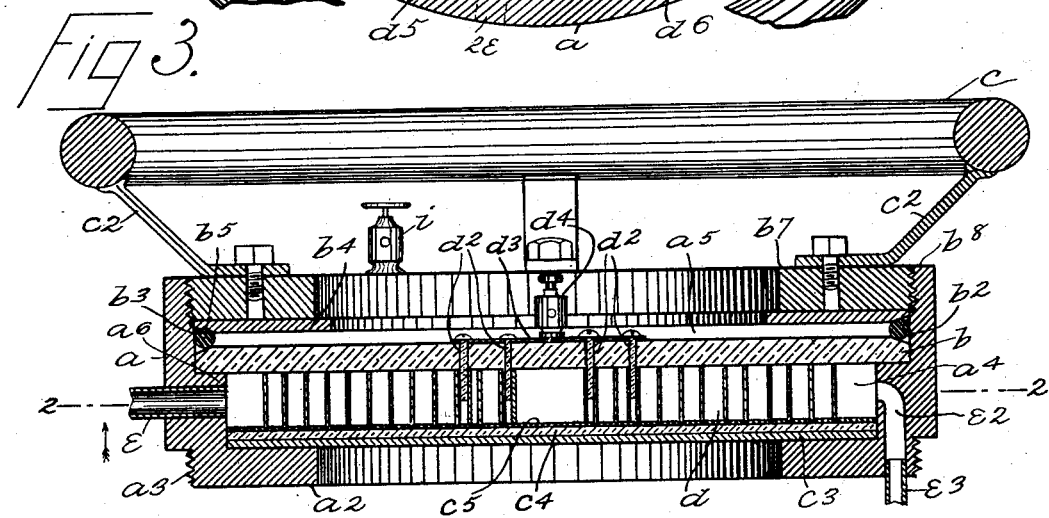

UNITED STATES PATENT OFFICE.

ERNEST KAISER, OF NEW YORK, N. Y.

WATER-PURIFIER.

SPECIFICATION forming part of Letters Patent No. 719,471, dated February 3, 1903.

Application filed May 8, 1902. Serial No. 106,392. (No model.)

*To all whom it may concern:*

Be it known that I, ERNEST KAISER, a citizen of the United States, residing at New York, in the county of New York and State of New York, have invented certain new and useful Improvements in Water-Purifiers, of which the following is a full and complete specification, such as will enable those skilled in the art to which it appertains to make and use the same.

The object of this invention is to provide an improved electric water-purifier which is designed to kill or destroy all forms of animal life which may be in the water, such as germs or microbes of various kinds and classes, said purifier being also intended to be used in connection with a filter through which the water is passed after it is passed through the purifier, a further object being to provide a water-purifier of the class specified which may be used either with or independently of a water-filter; and with these and other objects in view the invention consists in an electric water-purifier constructed as hereinafter described and claimed.

The invention is fully disclosed in the following specification, of which the accompanying drawings form a part, in which the separate parts of my improvement are designated by the same reference characters in each of the views, and in which—

Figure 1 is a side view of my improved water-purifier, part of the construction being shown in section; Fig. 2, a horizontal section on the line 2 2 of Figs. 1 and 3; Fig. 3, a vertical section on the line 3 3 of Fig. 2; Fig. 4, a bottom plan view of a switch device used in connection with a water-valve; Fig. 5, a view of said switch and valve mechanism at right angles to that shown in Fig. 1; Fig. 6, another view of a detail of said switch and valve mechanism at right angles to that shown in Fig. 5, and Fig. 7 a side view of a detail of the construction.

In the practice of my invention I provide a circular metal casing $a$, which is provided at the bottom with an inwardly-directed annular flange $a^2$, which forms the base of said casing and which may be continuous, so as to form an integral bottom, if desired, and around this bottom flange $a^2$ is preferably formed a screw-thread $a^3$, by means of which the device may be secured to a filter, if desired. The interior of the casing $a$ is divided into two parts, consisting of a bottom part $a^4$ and a top part $a^5$, and the bottom part $a^4$ is of a slightly less diameter than the top part $a^5$, whereby an annular shoulder $a^6$ is formed, and on this annular shoulder $a^6$ is placed a plate $b$ of slate, glass, hard rubber, or any other non-conducting material, and the upper side of this plate at its perimeter is preferably beveled, as shown at $b^2$, and placed around the same is a packing-ring $b^3$, over which is placed an annular plate $b^4$, the bottom surface of which at its perimeter is beveled, as shown at $b^5$, and between the annular plate $b^5$ and the plate $b$ the packing-ring $b^3$ is securely held by means of the beveled edges of said plates. The annular plate $b^4$ is held in place by a screw-threaded ring or annular plate $b^7$, which is screwed into the top of the casing $a$, as shown at $b^8$, and rests on the annular plate $b^4$, and said ring or annular plate $b^7$ is provided with a hand-ring $c$, which is connected therewith by a radial and upwardly-directed arm $c^2$, which is secured to said ring or annular plate $b^7$, and by means of the hand-ring $c$ the ring or annular plate $b^7$ may be screwed into position or removed therefrom whenever desired.

The bottom of the compartment $a^4$ comprises a bottom plate $c^3$, over which is placed a plate $c^4$ of slate, glass, or other similar material, and over the plate $c^4$ is placed a layer $c^5$ of paraffin, soft rubber, or other suitable insulating material.

Between the plate $b$ of non-conducting material which supports the top and bottom compartment in the casing $a$ and the bottom of the compartment $a^4$ and secured to the plate $b$ and removable therewith are a plurality of spirally-arranged partition-plates $d$, composed of any suitable conducting material, but preferably composed of aluminium or an alloy of aluminium, and in practice the casing $a$ and the bottom plate $c^3$ are also preferably composed of aluminium or alloy of aluminium. The spirally-arranged partition-plates $d$ are preferably eight in number and are all curved in the same direction, but, as shown in the drawings, are arranged in two separate sets of four each, and the ends of these sets terminate at opposite points at the center of the compartment $a^4$, and two of each set at their central terminals are connected with posts $d^2$, which pass through the plate $b$ and are connected with the contact-plate $d^3$, with which is connected a binding-post $d^4$, and the ends of the other spiral plates $d$ at their central terminals have no connection, and the opposite ends thereof are in electrical connection with the casing $a$, as shown at $d^5$ and $d^6$, and the connection at $d^5$ is preferably made as shown in Fig. 2, in which the ends of the plates $d$ are provided with blocks, which fit in recesses formed in the casing $a$, and these blocks are held in position by the plate $b$, and the connection $d^6$ of the spiral plates $d$ with the casing $a$ is simply one made by contact, and the ends of these plates at $d^6$ are pointed, as shown in Fig. 7, so that the water will flow freely around the said ends of said plates, and by means of this construction it will be seen that the water cannot flow past the connection at $d^5$ or from the outer compartment formed by the spiral plates connected at $d^5$ and the next adjacent inner compartment.

The casing $a$ is also provided with a water-inlet pipe $e$ and diametrically opposite the pipe $e$ with a water-outlet $e^2$, with which is connected a water-pipe $e^3$, and in practice the water enters the casing $a$ through the pipe $e$ and flows as indicated by the arrows in Fig. 2 and leaves through the outlet $e^2$, and it will thus be seen that the water flows to and from the center of the compartment $a^4$ and is thus held for the greatest possible length of time in connection with the spirally-arranged plates $d$ and the wall of the casing $a$, which in the operation of this apparatus are charged with electricity. I also provide the water-discharge pipe $e^3$ with a valve-casing $e^4$ and valve $e^5$, which is provided with a stem $e^6$ and hand-wheel $e^7$, and in connection with this valve I employ an electrical switch mechanism of the following construction: The valve-casing $e^4$ is provided at its upper and lower ends with circular insulating-disks $f$ and $f^2$, and the upper disk $f$ is provided with binding-posts $f^3$ and $f^4$, to which are respectively secured downwardly-directed contact devices $f^5$ and $f^6$. The lower disk $f^2$ is also provided with upwardly-directed spring contact devices $f^7$ and $f^8$, which are similar to the contact devices $f^5$ and $f^6$, and the contact device $f^8$ is secured to the disk $f^2$ by means of a nut $g$, and the contact device $f^7$ is secured to the disk $f^2$ by means of a binding-post $g^2$, and the contact devices $f^7$ and $f^8$ are electrically connected at the bottom of the disk $f^2$ by a segmental plate $g^3$.

Secured to the end of the valve $e^5$ opposite the wheel $e^7$ is a block $g^4$ of insulating material, to which is firmly secured a contact-plate $g^5$ of conductive material, and said plates and blocks, as will be understood, turn with the valve $e^5$ when the latter is operated.

Secured to the valve-stem $e^6$ opposite the block $g^4$ is a plate $g^6$, which turns with said valve and valve-stem and which is provided on its outer edge with depressions or recesses $g^7$, which are arranged to engage a small wheel or roller $g^8$, attached to a lever $h$, the lower end of which is pivoted at $h^2$ and the upper end of which is connected with a spring $h^3$, which is secured at $h^4$ to a hanger connected with the top disk $f$. The arm $h$ and the spring $h^3$ are so arranged that the wheel or roller $g^8$ is in the same vertical plane as the plate $g^6$, and by means of said spring $h^3$ the roller $g^8$ is caused to always bear on the perimeter of the plate $g^6$. The recesses or depressions $g^7$ of the plate $g^6$ are shaped as shown in Fig. 6, so that the valve $e^5$ can only be turned in one direction, the reason of which will be hereinafter explained.

This apparatus is intended to be connected with the three-wire electric system now in use, in which one wire is positive, one negative, and one neutral, and in practice the positive wire $i^2$ is secured to the binding-post $f^3$, the negative wire $i^3$ to the binding-post $f^4$, and the neutral wire $i^4$ to the binding-post $i$, which is secured to the casing of the purifier, and the said wires are successively designated in Fig. 1 by the reference characters $i^2$, $i^3$, and $i^4$, and another wire $i^5$ connects the binding-post $d^4$, hereinbefore described, with the binding-post $g^2$ at the bottom of the switch.

The three-wire system above referred to is a direct system, and in the operation of this apparatus the neutral wire $i^4$ alternately becomes positive and negative, according to the position of the parts of the apparatus. When the parts of the apparatus are in the position shown in Fig. 1, the wire $i^3$ being negative, as hereinbefore described, the current must pass over the neutral wire $i^4$, which is then positive, thence through the casing $a$ and the water therein to the partition-plates $d$, binding-post $d^4$, and wire $i^5$ to the post $g^2$, and through the switch to the negative wire $i^3$ and back to the dynamo. When the switch is turned through half a circle, so that the contact-plate $g^5$ connects the contacts $f^5$ and $f^7$, the positive wire $i^2$ is then in circuit and the current passes over the wire $i^2$ through the switch-wire $i^5$ to the partition-plates $d$ and through the water to the casing $a$ and back to the dynamo over the neutral wire $i^4$, and the action of the current in the casing $a$ is thereby reversed, thus overcoming solarization.

It will be understood that the neutral wire $i^4$ is always grounded, thus making the wire connection with the casing $a$ unnecessary, provided that said casing has electrical connection with the ground or water, and I may thus use either this construction or that shown in the drawings.

The valve $e^5$ and valve-casing $e^4$ are so formed that when the valve is open and the water is free to pass through the pipe $e^3$ the block $g^4$ and the plate $g^5$ will be in the position shown in Fig. 1 and said plate will make contact with the contact devices $f^6$ and $f^8$, and when the valve-stem is turned so as to close the opening through the valve-casing and through the pipe $e^3$ the block $g^4$ will be turned at right angles to the position shown in Fig. 1 and will be directed upwardly, and the electric circuit through the contact devices $f^6$ and $f^8$ and through the wires $i^3$ and $i^5$ will be broken. Another turn of the valve $c^9$ through ninety degrees and to the right will open the passage through the pipe $e^3$ and will bring the plate $g^5$ into connection with the contact devices $f^5$ and $f^7$, and the circuit will be closed through the wires $i^2$ and $i^5$ and at the same time through the spiral plates $d$, the casing $a$, and the wire $i^4$, and it will also be understood that in the position of the valve shown in Fig. 1 the spiral plates $d$, the casing $a$, and the wire $i^4$ are also in circuit. Another quarter-turn of the valve to the right and the plate $g^5$ will be directed downwardly, the pipe $e^3$ will be closed, and the circuits before described will be broken, and this operation may be performed or repeated whenever necessary, it being understood that the turning of the valve through one-quarter of a circuit will close the circuits when open and open them when closed and that when the circuits are closed the passage through the pipe $e^3$ is open and when the circuits are open the passage through the pipe $e^3$ is closed.

As hereinbefore described, the water enters the casing $a$ through the pipe $e^3$ and flows, as described, between the spiral plates $d$ into the central portion of the compartment $a^4$ and then flows back in the reverse direction, all as indicated by the arrows, and leaves the casing or said compartment at $e^2$, and by this means it will be seen that the water is forced to travel in contact with the casing $a$ and the spiral plates $d$ through the greatest possible distance and is thus maintained for the longest possible time in contact with said plates and said casing. It will be understood that the water in passing through the casing $a$ is thoroughly charged with electricity, the circuits always being completed when the water is passing through the pipe $e^3$, and by means of this arrangement the water is thoroughly and completely sterilized, all germ life therein being destroyed. During this operation the process of polarization is continually carried on, and molecules of matter collect on one set of the spiral plates $d$ while the valve $e^3$ is in one position, and in the course of time this would diminish the force of the current or effect thereof on the water; but by turning the valve through one-half a circuit the other set of spiral plates are thrown into circuit and this operation of polarization is reversed and the molecules of matter are discharged from the second set of the plates $d$ and deposited on the surface of the first set of plates $d$, and it will be understood that this operation or changing of the polarization of the plates $d$ may be repeated whenever necessary or as often as desired simply by turning the valve through one-half a circuit, and by reason of the construction of the plate $g^6$, which is secured to the valve $e^5$ and the wheel or roller $g^8$, the valve $e^5$, as hereinbefore described, can only be turned in one direction, and the reversal of the above-described operation is therefore made impossible.

Instead of putting the water-inlet at $e$ and the water-outlet at $e^2$, as indicated in Fig. 2, the said inlet may be placed as indicated in dotted lines at $2^e$ and the outlet as indicated in dotted lines at $3^e$ in Fig. 2, so as to cause a more perfect, positive, and direct circulation of the water.

This apparatus is simple in construction and operation and perfectly adapted to accomplish the result for which it is intended, and the same may be used wherever apparatus of this class are desired, and I reserve the right to make all such changes and alterations therein as fairly come within the scope of my invention.

Having fully described my invention, what I claim as new, and desire to secure by Letters Patent, is—

1. In an apparatus of the class described, a casing provided with a bottom portion having an insulating-cover, an insulating-plate secured in said casing midway thereof and forming a bottom compartment, a plurality of spirally-arranged metal plates connected with said insulating-plate and removable therewith, said spirally-arranged plates being divided into sets, the inner terminals of which are near the center of said compartment, and the alternate plates of each set at their inner terminals being in electrical connection with a binding-post secured to the top of said insulating-plate, and the outer ends of the other spiral plates being in connection with the casing, said casing being also provided at one side with a water-supply and at the opposite side with a water-discharge pipe, substantially as shown and described.

2. In an apparatus of the class described, a casing provided with a bottom portion having an insulating-cover, an insulating-plate secured in said casing midway thereof and forming a bottom compartment, a plurality of spirally-arranged metal plates connected with said insulating-plate and removable therewith, said spirally-arranged plates being divided into sets, the inner terminals of which are near the center of said compartment, and the alternate plates of each set at their inner terminals being in electrical connection with a binding-post secured to the top of said insulating-plate and the outer ends of the other spiral plates being in connection with the casing, said casing being also provided at one side with a water-supply and at the opposite side with a water-discharge pipe, and said water-supply pipe being provided with a valve-casing and valve and an electric switch apparatus connected therewith and with said casing whereby the turning of said valve will alternately throw the separate sets of said spiral plates out of and into circuit substantially as shown and described.

3. In an apparatus of the class described, a casing $a$ provided with a bottom having an insulating-cover, an insulating-plate $b$ adapted to be placed in said casing so as to form a bottom compartment therein, a plurality of spirally-arranged metal plates $d$ connected with said plate $b$, said spirally-arranged metal plates being divided into separate series, the inner terminals of which are near the center of said compartment, the alternate spirally-arranged plates being connected at their inner ends with a binding-post secured to said insulating-plate and the outer ends of the other plates being in connection with said casing, a packing-ring $b^3$ placed around the perimeter of the plate $b$, an annular plate $b^4$ for holding the packing-ring in place and a ring or annular plate $b^7$ adapted to be screwed into the top of said casing, substantially as shown and described.

4. In an apparatus of the class described, a casing, a movable bottom portion provided with an insulating-covering, an insulating-plate adapted to be secured in said casing so as to form a bottom compartment therein, a plurality of spirally-arranged metal plates secured to said insulating-plate and divided into sets, the inner ends of which terminate near the middle of said compartment, the alternate spirally-arranged plates being connected at their inner ends with a binding-post secured to said insulating-plate and the outer ends of the other spirally-arranged plates being in connection with said casing, and a binding-post secured to said casing, substantially as shown and described.

5. In an apparatus of the class described, a casing, a movable bottom portion provided with an insulating-covering, an insulating-plate adapted to be secured in said casing so as to form a bottom compartment therein, a plurality of spirally-arranged metal plates secured to said insulating-plate and divided into sets, the inner ends of which terminate near the middle of said compartment, the alternate spirally-arranged plates being connected at their inner ends with a binding-post secured to said insulating-plate and the outer ends of the other spirally-arranged plates being in connection with said casing, and a binding-post secured to said casing, said casing being also provided at one side with a water-supply pipe and at the opposite side with a water-discharge pipe, provided with a valve-casing and valve, and an electrical switch apparatus connected with said valve-casing and operated by said valve and in connection with said binding-posts whereby the separate sets of the spirally-arranged plates may be electrically thrown into and out of circuit, substantially as shown and described.

6. In an apparatus of the class described, a water-pipe provided with a valve-casing and valve, insulating-plates connected with the upper and lower ends of said valve-casing, two binding-posts connected with the upper insulating-plate, two contact devices depending therefrom, two contact devices connected with the lower insulating-plate and projecting upwardly and in electrical connection, a binding-post connected with one of said last-named contact devices, a contact-plate connected with one end of the valve in the valve-casing, and means whereby said valve may be turned in one direction, substantially as shown and described.

In testimony that I claim the foregoing as my invention I have signed my name, in presence of the subscribing witnesses, this 29th day of April, 1902.

ERNEST KAISER.

Witnesses:
F. A. STEWART,
F. F. TELLER.